(12) United States Patent
Matre

(10) Patent No.: US 12,729,058 B2
(45) Date of Patent: Sep. 8, 2026

(54) CONTROLLING STORAGE LOCATIONS OF PRODUCTS STORED IN STORAGE CONTAINERS IN AN AUTOMATED STORAGE AND RETRIEVAL SYSTEM

(71) Applicant: Autostore Technology AS, Nedre Vats (NO)

(72) Inventor: Synnøve Solberg Matre, Sandeid (NO)

(73) Assignee: AutoStore Technology AS, Nedre Vats (NO)

( * ) Notice: Subject to any disclaimer, the term of this patent is extended or adjusted under 35 U.S.C. 154(b) by 323 days.

(21) Appl. No.: 18/263,015

(22) PCT Filed: Jan. 28, 2022

(86) PCT No.: PCT/EP2022/052093
§ 371 (c)(1),
(2) Date: Jul. 26, 2023

(87) PCT Pub. No.: WO2022/162170
PCT Pub. Date: Aug. 4, 2022

(65) Prior Publication Data
US 2024/0109721 A1 Apr. 4, 2024

(30) Foreign Application Priority Data
Jan. 29, 2021 (NO) .................................... 20210118

(51) Int. Cl.
*B65G 1/04* (2006.01)
*B65G 1/06* (2006.01)
(Continued)

(52) U.S. Cl.
CPC ......... *B65G 1/0464* (2013.01); *B65G 1/0485* (2013.01); *B65G 1/065* (2013.01); *B65G 1/1371* (2013.01); *G06Q 10/087* (2013.01)

(58) Field of Classification Search
CPC .... B65G 1/0464; B65G 1/0485; B65G 1/065; B65G 1/1371; B65G 1/1373; G06Q 10/087; G06Q 10/0631
See application file for complete search history.

(56) References Cited

U.S. PATENT DOCUMENTS 11,360,465 B2 * 6/2022 Austrheim .............. B60L 53/80
12,030,718 B2 * 7/2024 Stadie .................. B65G 1/0464
(Continued)

FOREIGN PATENT DOCUMENTS

CN 109649913 A 4/2019
CN 110888903 A 3/2020
(Continued)

OTHER PUBLICATIONS

Martin, Benoit, Communication pursuant to Article 94(3) EPC in European Patent Application No. 22702944.4, mailed Mar. 31, 2025, 5 pages, European Patent Office, Rijswijk, Netherlands.
(Continued)

*Primary Examiner* — Garcia Ade
(74) *Attorney, Agent, or Firm* — Baker Botts L.L.P.

(57) ABSTRACT

A method controls storage locations of products stored in storage containers in an automated storage and retrieval system operated by container handling vehicles. The storage and retrieval system comprises a grid structure with storage columns adapted for holding stacks of storage containers. The grid structure has a corresponding rail system above the storage columns for guiding movements of the vehicles adapted for transferring storage containers to and from the storage columns. Each vehicle comprises a vehicle controller connected to driving means for controlling movements of the vehicle along the rail system relative to movements of other vehicles. Controlling of container handling vehicles
(Continued)

and storage locations of storage containers is handled by a main controller of the automated storage and retrieval system communicating with a Warehouse Management System configured to register each storage container to be stored and type of one or more products placed in the storage containers. The method for storing storage containers includes: a transferring step, a transmitting step, a reading step, and a selecting step. The transferring step transfers a set of storage rules from the Warehouse Management System to the main controller. The transmitting step transmits unique identification codes of the storage containers from the Warehouse Management System to the main controller, and corresponding content codes from a content code module to the main controller. The content codes are linked to storage rules that the main controller will apply for storing the storage containers at locations defined by the storage rules. The reading step reads the content codes in the main controller, and determines a storage location for the storage container according to the storage rule linked to the content code. The selecting step selects container handling vehicles for transferring the storage container, and for each selected container handling vehicle transmits instructions from the main controller to the vehicle controller to transfer the storage container to a storage location defined by the corresponding storage rule and updates a storage location database with the identification and storage location of the storage container.

6 Claims, 3 Drawing Sheets

(51) Int. Cl.

| | |
|---|---|
| ***B65G 1/137*** | (2006.01) |
| ***G06Q 10/087*** | (2023.01) |

(56) References Cited

U.S. PATENT DOCUMENTS

| | | | | |
|---|---|---|---|---|
| 12,286,301 | B2 * | 4/2025 | Gravelle | B65G 1/04 |
| 12,503,311 | B2 * | 12/2025 | Gravelle | B25J 9/0084 |
| 2018/0201445 | A1 | 7/2018 | Battles et al. | |
| 2018/0273297 | A1 | 9/2018 | Wagner et al. | |
| 2018/0273298 | A1 | 9/2018 | Wagner et al. | |
| 2018/0365347 | A1 | 12/2018 | Wang et al. | |
| 2020/0198894 | A1 | 6/2020 | Jarvis et al. | |
| 2021/0101744 | A1 * | 4/2021 | Hognaland | B65G 1/0464 |
| 2021/0221618 | A1 | 7/2021 | Austrheim | |
| 2021/0237973 | A1 | 8/2021 | Heggebo et al. | |
| 2024/0199325 | A1 * | 6/2024 | Lindbo | B65G 1/0464 |

FOREIGN PATENT DOCUMENTS

| | | | | |
|---|---|---|---|---|
| CN | 112262084 | A | 1/2021 | |
| CN | 112262089 | A | 1/2021 | |
| DE | 20 2012 012 928 | U1 | 4/2014 | |
| EP | 3166058 | A1 * | 5/2017 | B65G 1/0492 |
| EP | 3 584 197 | A1 | 12/2019 | |
| EP | 4663579 | A1 * | 12/2025 | B65G 1/1375 |
| NO | 317366 | B1 | 10/2004 | |
| NO | 20191379 | A1 | 5/2021 | |
| WO | 2014/090684 | A1 | 6/2014 | |
| WO | 2015/185628 | A2 | 12/2015 | |
| WO | 2019/238670 | A1 | 12/2019 | |
| WO | 2019232651 | A1 | 12/2019 | |

OTHER PUBLICATIONS

Chen, Chengkai, Office Action in CN202280012448.8, mailed Jun. 11, 2025, 19 pages, The State Intellectual Property Office of the People's Republic of China, Beijing, China.

Chen, Chengkai, Office Action in Chinese patent application 202280012448.8, mailed Dec. 9, 2025, 16 pages, The State Intellectual Property Office of the People's Republic of China, Beijing, China.

International Search Report issued in corresponding International Application No. PCT/EP2022/052093, mailed on Apr. 25, 2022 (5 pages).

Written Opinion issued in corresponding International Application No. PCT/EP2022/052093, mailed on Apr. 25, 2022 (9 pages).

International Preliminary Report on Patentability issued in corresponding International Application No. PCT/EP2022/052093, mailed on Apr. 26, 2023 (22 pages).

Norwegian Search Report issued in corresponding Norwegian Application No. 20210118, mailed on Aug. 28, 2021 (2 pages).

* cited by examiner

CONTROLLING STORAGE LOCATIONS OF PRODUCTS STORED IN STORAGE CONTAINERS IN AN AUTOMATED STORAGE AND RETRIEVAL SYSTEM

INTRODUCTION

The present invention relates to a method, system and computer program product for controlling storage locations of products stored in storage containers in an automated storage and retrieval system comprising a grid structure and a corresponding rail system for guiding movements of the vehicles operating the storage containers.

BACKGROUND

Storage and retrieval systems are well known. Vehicles operating these are controlled by a controller communicating with controllers in each vehicle.

FIG. 1 illustrates a typical prior art automated storage and retrieval system 10 having a framework structure 100 and where container handling vehicles 150, also called robots, are operating the automated storage and retrieval system 10 when running on a rail system 108 on top of the framework structure 100.

The framework structure 100 comprises a plurality of upright members 102 and optionally a plurality of horizontal members 103 supporting the upright members 102. The members 102, 103 may typically be made of metal, e.g. extruded aluminium profiles.

The framework structure 100 defines a storage grid 104 comprising storage columns 105 arranged in vertical rows, in which storage containers 106, also known as bins, are stacked one on top of another to form stacks 107. Each storage container 106 may typically hold a plurality of product items.

The automated storage and retrieval system 10 comprises a rail system 108 for guiding container handling vehicles 150. The rail system 108 is arranged in a grid pattern across the top of the storage grid 104. The container handling vehicles 150 are running on the rail system 108 and are operated to lower and raise storage containers 106 into and from the storage columns 105 as well as transporting the storage containers 106 on the rail system 108. The horizontal extent of a storage column 105 is defined by a grid cell 122 marked by thick lines in FIG. 1. The grid cells 122 define the layout of the rail system 108.

The rail system 108 comprises a first set of parallel rails 110 arranged to guide movement of the container handling vehicles 150 in a first direction X across the top of the frame structure 100, and a second set of parallel rails 111 arranged perpendicular to the first set of rails 110 to guide movement of the container handling vehicles 150 in a second direction Y which is perpendicular to the first direction X.

In this way, the rail system 108 defines grid columns above which the container handling vehicles 150 can move laterally above the storage columns 105, i.e. in a plane which is parallel to the horizontal X-Y plane.

Each container handling vehicle 150 comprises a vehicle body and a wheel arrangement of eight wheels where a first set of four wheels enable the lateral movement of the container handling vehicles 150 in the X direction and a second set of the remaining four wheels enable the lateral movement in the Y direction. One or both sets of wheels in the wheel arrangement can be lifted and lowered, so that the first set of wheels and/or the second set of wheels can be engaged with respective set of rails 110, 111, where this is defined by a controller controlling driving means in the container handling vehicle 150 for controlled directional movements of the container handling vehicle 150.

Each container handling vehicle 150 further comprises a lifting device (not shown) for vertical transportation of storage containers 106, e.g. raising a storage container 106 from, and lowering a storage container 106 into, a storage column 105. The lifting device comprises one or more gripping/engaging devices (not shown) adapted for engaging a storage container 106. The gripping/engaging devices can be lowered from the vehicle 150 by the lifting device for adjusting the position of the gripping/engaging devices in a third direction Z which is orthogonal the first and second directions X, Y.

Each container handling vehicle 150 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 150 may have a cantilever construction, as is described in NO317366, the contents of which are also incorporated herein by reference.

In a storage grid 104, most of the grid columns are storage columns 105, i.e. grid columns where storage containers 106 are stored in stacks 107. However, a storage grid 104 normally has at least one grid column which is not used for storing storage containers 106, but instead is used for transferring storage containers. Container handling vehicles 150 use such grid columns for dropping off and/or picking up storage containers 106 so that they can be transported between a first location in the storage grid 104 and a second location where the storage containers 106 can be accessed from the outside of the storage grid 104 or transferred out of or into the storage grid 104. Within the art, a transferring location is normally referred to as a “port” and the grid column in which the port is located may be referred to as a “delivery column” 119. Drop-off and pick-up ports for the container handling vehicles 150 operating on the rail system 108 on top of the framework structure 100 are referred to as “upper ports of a delivery column” 119. While the opposite end of the delivery column, i.e. below the frame structure 100, is referred to as “lower ports of a delivery column”.

The storage grid 104 in FIG. 1 comprise two delivery columns 119 and 120. The first delivery column 119 may for example comprise a dedicated drop-off port where a container handling vehicle 150 can drop off a storage container 106 retrieved from a storage column 105. The storage container 106 will then be transported through the delivery column 119 and further to an access- or a transfer station (not shown). The second delivery column 120 may comprise a dedicated pick-up port where a container handling vehicle 150 can pick up a storage container 106, that have been transported through the delivery column 120 from an access or a transfer station (not shown), and transfer it to a storage column 105. Each of the ports of the first and second delivery column 119, 120 may comprise a port which is suitable for both pick-up and drop-off storage containers 106.

For transfer of storage containers out of, or into the storage grid 104, there may also be lower ports provided in a delivery column. Such lower ports are for example used for transferring storage containers 106 to a picking station, to another storage facility (e.g. to another storage grid), directly to a transport vehicle (e.g. a train or a lorry), or to a production facility.

The second location, where a storage container 106 can be accessed from the outside of the storage grid 104, is typically a picking, also called a stocking station, where product items are removed from or positioned into the storage containers 106.

At a picking station, products are picked from or placed in storage containers 106 by an operator or robots or a combination of these. Storage containers 106 are normally never removed once accessed but are returned to the automated storage and retrieval system 10 to a storage column 105.

FIG. 2 illustrates a typical set-up for communication between a Warehouse Management System (WMS) 200 and a main controller 220 of an automated storage and retrieval system 10. The main controller 220 communicates with vehicle controllers 250 for instructing container handling vehicles 150 to handle identified storage containers 106 according to instructions received from the WMS 200. A picking station comprises an interface providing interaction with a Warehouse Management System (WMS) 200 keeping track of each storage container and their content. By scanning unique identifiers or codes referring to products that are placed in or removed from storage containers, the WMS database 205 will be updated with information related to type and number of products that are removed from and that are left in storage containers 106 before returning them for storage.

The main controller 220 is adapted for monitoring and controlling the operation of the automated storage and retrieval system 10. It is computerized and is connected to a storage location database 225 with updated data of the location and identification of each storage container 106 and the container handling vehicles 150. The main controller 220 will receive instructions from the WMS related to which storage containers 106 to be handled at any time, i.e. which storage containers 106 to be retrieved or stored in the storage grid 104.

Each container handling vehicle 150 receives movement instructions from the main controller 220 for transporting a specific storage container 106 from one location to another location. For controlling the traffic flow of the container handling vehicles 150 operating on the storage grid 104, the main controller 220 will at all time have an updated overview of positions and movements of all container handling vehicles 150. The main controller 220 is optimized for finding suitable storage locations in the storage grid 104 for each storage container 106 to be stored.

When a storage container 106 stored in the storage grid 104 disclosed in FIG. 1 is to be accessed, the main controller 220 may for instance instruct one of the container handling vehicles 150 to retrieve the storage container 106 from its current location in the storage grid 104 and to transport it to or through the first delivery column 119. This operation involves moving the container handling vehicle 150 to a grid location above the storage column 105 in which the target storage container 106 is located, retrieving the storage container 106 from the storage column 105 using the container handling vehicle's lifting device (not shown), and transporting the storage container 106 to the port the first delivery column 119. If the target storage container 106 is located deep within a stack 107, i.e. with one or a plurality of other storage containers stacked above the target storage container 106, the operation will include temporarily moving the storage containers 106 above the target storage container 106 prior to lifting the target storage container 106 from the storage column 105. This step, which is sometimes referred to as "digging" within the art, may be performed with the same container handling vehicle 150 that is subsequently used for transporting the target storage container 106 to the delivery column, or with one or a plurality of other cooperating container handling vehicles 150. Alternatively, or in addition, the automated storage and retrieval system 10 may have container handling vehicles 150 specifically dedicated to the task of temporarily removing storage containers 106 from a storage column 105. Once the target storage container 106 has been removed from the storage column 105, the temporarily removed storage containers 106 can be repositioned into the original storage column 105 or alternatively be relocated to other storage columns 105.

When a storage container 106 is to be stored in the storage grid 104, one of the container handling vehicles 150 is instructed to pick up the storage container 106 from a port and to transport it to a grid location above a determined storage column 105 where it is to be stored. Storage containers 106 positioned above a target position within the storage column 105 are first removed, then the container handling vehicle 150 places the storage container 106 at the desired location. The removed storage containers 106 may then be lowered back into the storage column 105 or relocated to other storage columns 105.

As mentioned, the main controller 220 will have an overview of the locations of all vehicles 150 operating the storage and retrieval system 10. It will also have an overview of storage locations of all the storage containers 106 in the storage grid 104. The main controller 220 instructs each vehicle 150 to store or retrieve identified storage containers 106. The current position of each vehicle is continuously communicated from the vehicles 150 to the main controller 220. This is used as input for determining which vehicle 150 that shall handle a specified storage container, based on its current location.

Today, when a storage container 106 is to be stored in the storage grid 104, the main controller 200 receives information from the WMS identifying the specific storage container 106 arriving at a pick-up port of the storage grid 104. The main controller 220 normally selects a random storage column 105 where it can be placed. The WMS may instruct the main controller 220 to place the storage containers 106 at specified locations based on type of stored products. The reason for selecting specified storage location for storage containers 106 may be that certain types of products should not be stored in a cluster, e.g. flammable or dangerous products. Another reason may be to spread storage locations of same type of products to improve availability from current locations of all container handling vehicles 150. It may also be desirable to store fresh food/grocery in the upper parts of storage columns 105.

By letting the WMS handle the detailed control of storage locations of storage containers 106, performance penalties for the WMS will be the result, and it is less flexible than letting the main controller 220 select suitable storage locations for storage containers 106.

The WMS is an end user system controlled by an operator of the system. This is where details of both storage containers and their stored products are registered. The main controller 220 which is controlling the operation of the automated storage and retrieval system 10 normally only knows the identification of storage containers 106 and their locations in the storage grid 104.

The present invention provides a flexible solution where the main controller 220 determines a specific storage location of a specified storage container 106 based on its content code received from the WMS and storage rules associated to the content code.

SHORT DESCRIPTION OF THE INVENTION

The present invention is defined by a method, system and computer program product for controlling storage locations of products stored in storage containers in an automated storage and retrieval system operated by container handling vehicles, where the storage and retrieval system comprises a grid structure with storage columns adapted for holding stacks of storage containers, where the grid structure has a corresponding rail system above the storage columns for guiding movements of the vehicles adapted for transferring storage containers to and from the storage columns. Each vehicle comprises a vehicle controller connected to driving means for controlling movements of the vehicle along the rail system relative to movements of other vehicles. Controlling of container handling vehicles and storage locations of storage containers is handled by a main controller of the automated storage and retrieval system communicating with a Warehouse Management System adapted to register a storage container to be stored and one or more products placed in the storage container.

The method comprises the following steps for storing a storage container:

- transmitting a unique identification of the storage container and a corresponding content code, from the Warehouse Management System to the main controller, the content code is linked to a storage rule that the main controller will apply for the storage container;
- reading the content code in the main controller, and determining a storage location (x, y, z) for the storage container according to the storage rule linked to the content code;
- selecting a container handling vehicle for transferring the storage container, and transmitting instructions from the main controller to the vehicle controller of the selected vehicle to transfer the storage container to the determined storage location (x, y, z) and updating a storage location database with the identification and storage location of the storage container.

In one embodiment, one or more storage columns are linked to one or more storage rules defining type of products and number of same type of products that can be stored in each storage column. Each storage column may for instance have storage restrictions such as maximum number of storage containers containing similar products that can be stored in same storage column.

In one embodiment, an area of the storage columns is assigned to store same type of products. These storage columns will then be controlled by same storage rules.

In one embodiment, the storage rules are defined for products in a storage container by one or more of the following parameters: minimum or maximum distance between products; maximum number of same types of products in a storage column; maximum storage depth in a storage column; maximum or minimum time products should be stored; specific storage columns to be used etc.

The content code reflects which storage rule that is to be used for the products in a storage container. In addition to number of same type of products, the content code may for instance reflect total volume of a fluid in storage container. The total volume may determine which storage rule to use for storing for instance flammable or explosive content. For such content a storage rule may for instance define a maximum distance between storage containers with similar products, or that storage containers with dangerous products shall not be placed on top of each other or beside each other. Dangerous products will also typically be stored in special storage containers, e.g. a fireproof storage container for combustible products.

In contrast, and for security reasons, valuable products may for instance be spread around in lower levels of storage columns 105.

Identification of a storage container 106 can be done by providing it with a unique code. The products it is containing are identified with the content code. These codes can be two separate variables that are transmitted to the main controller 220 of the storage and retrieval system 10. They may also be merged and transmitted as one variable. The main controller 220 will then extract the content code from the variable and apply the corresponding storage rule.

Distance between products in storage containers 106 is determined in three dimensions (x, y, z). A distance between two storage containers 106 is found by first determining their positions (x, y, z) in storage columns 105. For determining the horizontal distance, i.e. in the x, y-direction, the length and/or width of a storage container 106 can be used as a measure plus a (n−1) spacing of a rail width, where n is the number of rails between the storage containers 106. The vertical distance, i.e. in the z-direction, can be determined from the heights of storage containers 106. Distances can be calculated to the centre of storage containers 106, or from a side of the storage containers 106, which would be the case to ensure a minimum separation, e.g. where stored products are explosives or flammable.

Distances can also be determined by working out diagonal distances between x, y, z positions of storage containers in the storage column.

A suitable storage location for storing a storage container 106 with a specific content code linked to a storage rule defining a minimum distance to similar products can be found by first calculating the distance from the x, y, z-position of a currently stored storage container 106 to other x, y, z-positions in storage columns 105.

Types of products are reflected in the content code. The storage rules can be applied to a range of product codes for instance representing similar products.

In one embodiment, a first and at least a second set of rules with different parameters are defined for storage columns. In this way, how storage of storage containers in a storage column is done can be changed by selecting a specific rule.

In one embodiment, different set of rules are applied according to time of day. One set of rules may for instance be used at daytime, while another set of rules is used at night-time. In this way, the storage and retrieval system can be controlled to operate differently according to time of day.

In one embodiment, the storage rules are enabled or disabled according to time of day.

The computer program product according to the invention is adapted to perform the method steps above when executed by a processor in a main controller of an automated storage and retrieval system descried herein.

The system according to the invention comprises the Warehouse Management System adapted to transmit a unique identification code of the storage container and a corresponding content code to the main controller. The content code is linked to a storage rule that the main controller will apply for storing the storage container.

The main controller of the automated storage and retrieval system is adapted to read the content code and determine a storage location (x, y, z) for the storage container according to a storage rule linked to the content code.

The main controller is further adapted to select a container handling vehicle for transferring the storage container, and to transmit instructions to the vehicle controller of the selected vehicle to transfer the storage container to the determined storage location (x, y, z) and update a storage location database with the identification and storage location of the storage container.

DETAILED DESCRIPTION OF THE INVENTION

Embodiments of the invention will now be described in greater detail and by way of example only with reference to the figures where:

Figure 1:
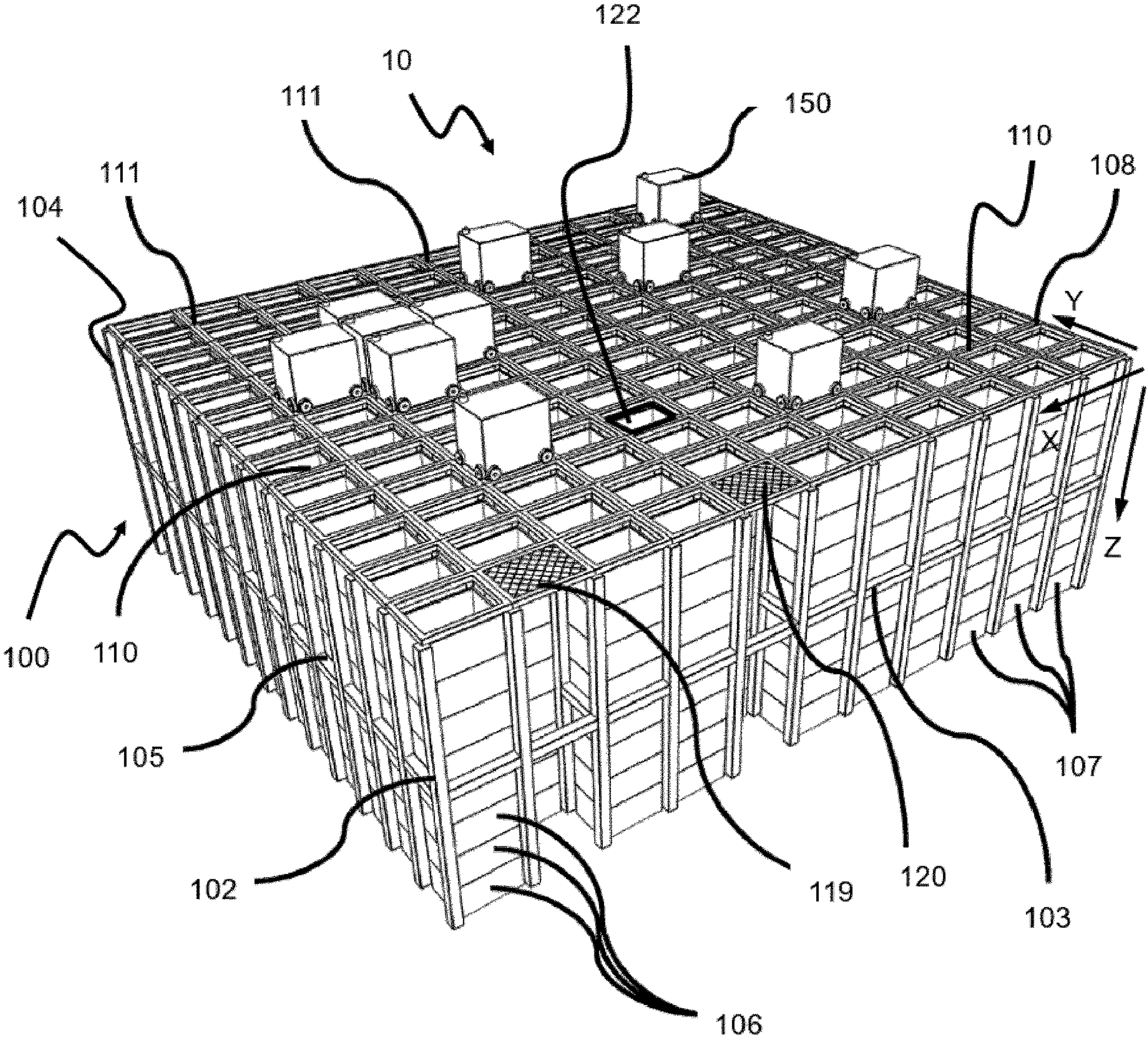
FIG. 1 shows a typical prior art automated storage and retrieval system where container handling vehicles are handling storage containers.

For the automated storage and retrieval system described above with reference to FIG. 1, information communicated between the Warehouse Management System (WMS) 200 and the main controller 220, when transferring a storage container 106 between a port and a storage location, is the identity of a storage container 106 to be handled. In addition to the identity of the storage container 106, the WMS must also know at least the type, and number of products in the storage container. In this way, an identified storage container storing a specific product can be retrieved from the storage and retrieval system when requested.

Some types of products to be stored in the automated storage and retrieval system described above, need to be stored according to strict regulations for avoiding accident or degrading of products. It may also be desirable to spread products stored in the storage grid 104, or to place storage containers 106 as high as possible in a stack of storage containers 106 in a storage column 105, thereby providing fast access to products in relevant storage containers 106 for all container handling vehicles 150.

When a storage container 106 is to be stored, the WMS 200 can, in addition to the identity of the storage container, also instruct the main controller 220 to place the storage container 106 at a specific location in the storage grid 104. This may however cause a performance penalty on other functions of the WMS 200.

Further, the WMS 200 will not know the storage locations of other storage containers 106 already stored in the storage grid 104. This is known by the main controller 220 communicating with a location database 225.

Figure 2:
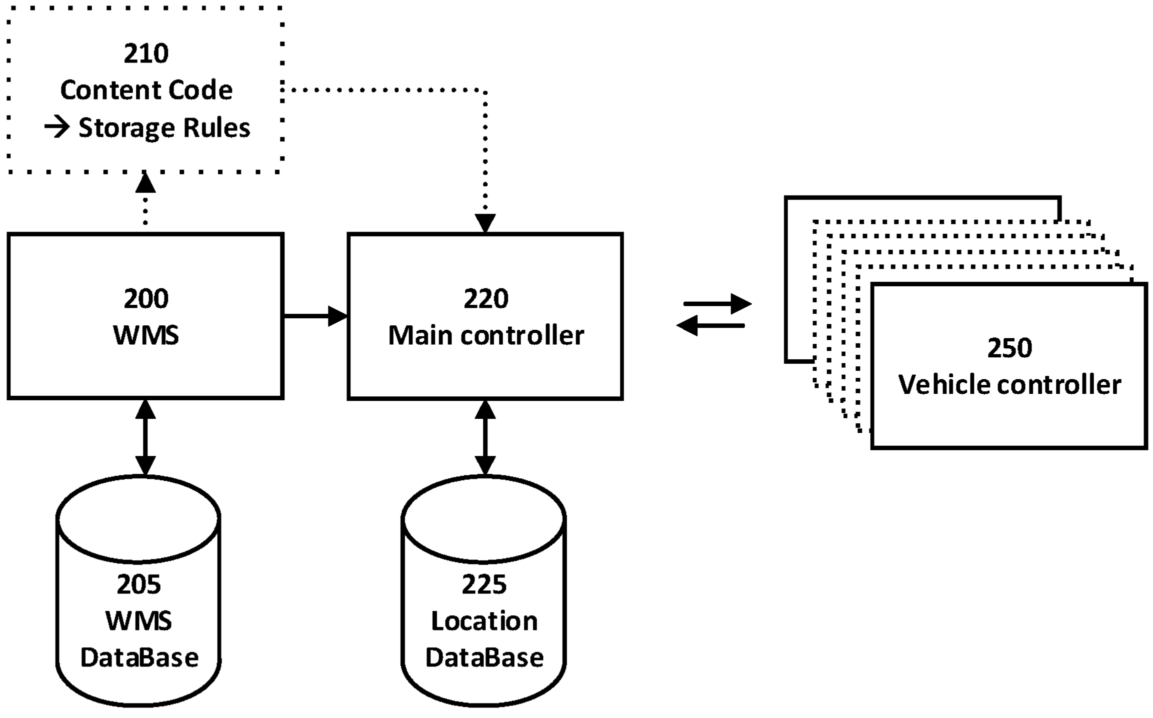
FIG. 2 illustrates communication between the Warehouse Management System and the main controller of the automated storage and retrieval system.

FIG. 2 which was explained above, also illustrates an additional content code module 210 according to an embodiment of the invention. The content code module 210 can be a separate module, as illustrated in the figure, or it may be an integrated module in the WMS 200.

The content code module 210 comprises content codes linked to storage rules describing how and/or where specific products shall be stored in the storage and retrieval system 10. The storage rules are set for different types of products, e.g. flammable, fluid, temperature sensitive etc. A content code does not need to reflect an exact product identification, defined by for instance a Stock Keeping Unit (SKU). Exact product information may only be known for the WMS. The content code may for instance reflect type and amount/number of a product, e.g. danger level, inflammability, weight/volume etc.

A storage rule may for instance state that one or more products should be stored in an upper part of a storage columns 105 having controlled temperature and humidity. A specific storage container 106 with such products will get a content code that is linked to a storage rule pointing to such a location.

A storage rule can be linked to one content code or a range of content codes. The content code module 210 exchanges content codes and corresponding storage rules between the WMS 200 and the main controller 220 of the automated storage and retrieval system 10.

When storing a storage container 106, the main controller 220 of the storage and retrieval system 10 only needs to know the identity of a storage container 106 and which storage rule that it is to be used based on a content code linked to the storage container 106.

When setting up an automated storage and retrieval system 10 with a set of storage rules for controlling storage locations of products, the WMS 200 is first updated with content codes and corresponding storage rules 350 defining storage location for products. This set of storage rules is transferred from the WMS 200 to the main controller 220. Once transferred, the main controller 220 is ready to apply the storage rules for identified storage containers having content codes. That is, an identified storage container 106 is subjected to a specific storage rule based on its content.

Figure 3:
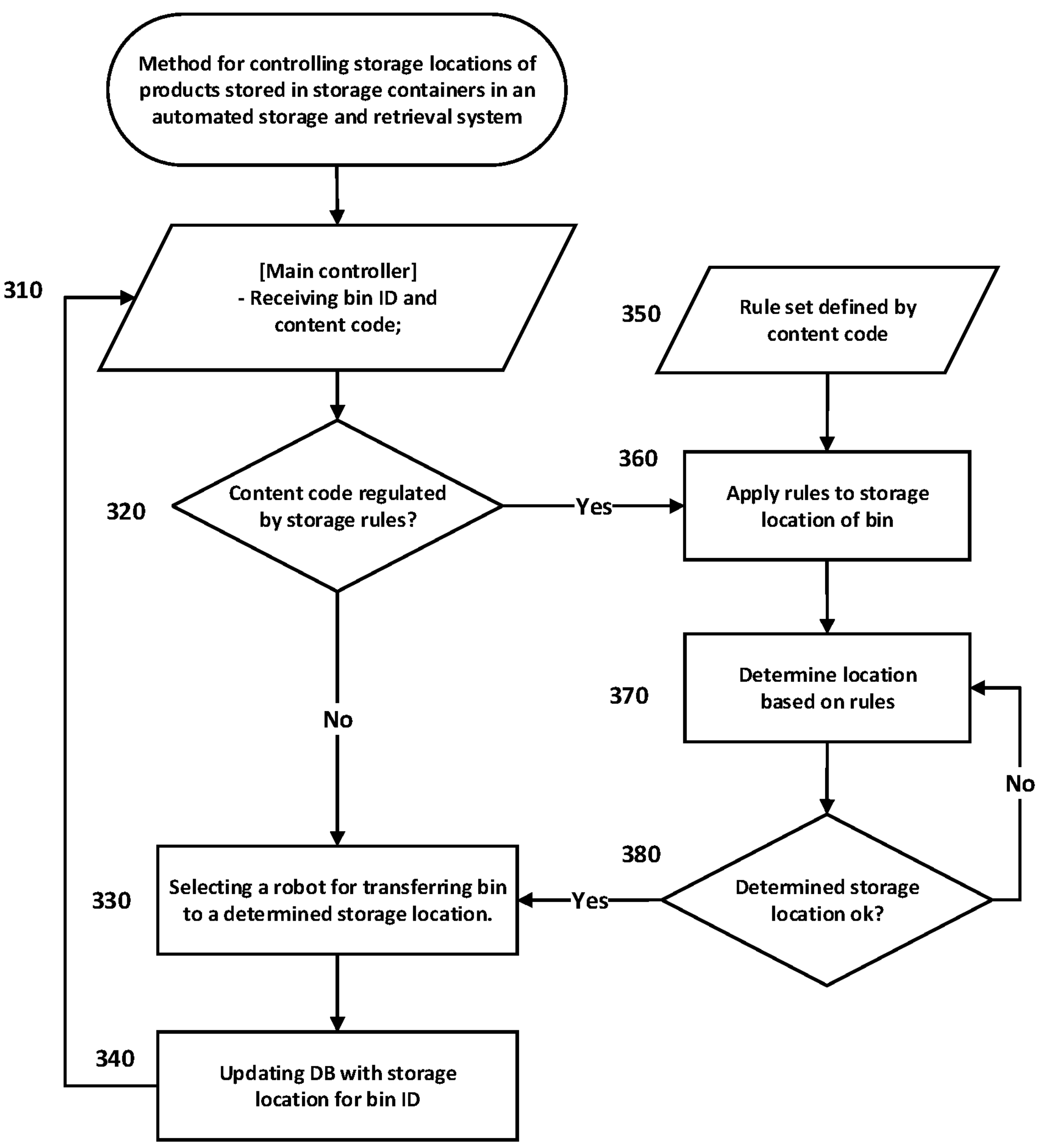
FIG. 3 is a flowchart illustrating the different steps performed by the main controller for controlling storage locations of products stored in storage containers.

FIG. 3 illustrates the different steps performed by the main controller 220 for controlling storage locations of products stored in storage containers 106. When the main controller 220 has been updated with the set of content codes and corresponding storage rules, the WMS 200 will transmit an identification of the storage container 106 to be stored together with a corresponding content code to the main controller 220.

When the main controller 220 has received an identification of the storage container 106 and a corresponding content code 310, it will interpret the content code and check 320 if it is regulated by storage rules. A specific content code or absence of a content code may for instance mean that the storage container 106 is not regulated by any storage rule and can be placed at a suitable location determined by the main controller 220 having the full overview of all the storage containers 106 currently stored in the storage and retrieval system 10.

If the content code indicates that the storage container 106 is not regulated by storage rules, or if the content code is absent, the main controller 220 will not apply rules for determining a specific storage location for the storage container 106. It will select a container handling vehicle 150 to handle the storage container 106 and determine a free storage location 330 where the storage container shall be stored. The storage location database 225 will then be updated 340 with the storage location of the identified storage container 106.

If, on the other hand, the content code indicates that the storage container 106 is regulated by one or more storage rules 360, the main controller 220 will apply the relevant rules from its rule set 350, previously received from the WMS 200, and determine a suitable storage location 370 according to the content code and corresponding storage rules. This may include determining if a first determined storage location is ok 380, i.e. is free and according to the applied storage rule. If not, a new location can be determined.

If a storage location in a storage column 105 currently is not free but occupied by one or more storage container 106 with products that are not restricted by a specific storage location, the storage containers 106 can first be moved to another location prior to storing the storage container 106 with products restricted by storage rules. Also, if it is determined that a storage container 106 shall be stored at a specific level below other storage containers 106, a digging operation is performed either by the container handling vehicle 150 handling the storage container 106 to be stored, or by other container handling vehicles 150. The removed storage containers 106 can be put back into the same storage column 105 or placed in other storage columns. Either way, their x, y, x positions of the moved storage columns 106 will be updated in the location database 225.

Several storage columns 105 can be controlled by same storage rules. A preferred storage location will then be the one providing the most time efficient operation for storing the storage container 106. If for instance another storage container 106 currently is being handled at possible one storage location, this will not be the first choice.

When a storage location of the storage container 106 has been determined, the main controller 220 selects a container handling vehicle 150 for transferring the storage container 106, and transmits instructions to the vehicle controller 250 of the container handling vehicle 150 to handle and transport the storage container 106 to the determined storage location 330. The storage location database 225 will then be updated 340 with the storage location of the identified storage container 106.

As understood from the description above, products in storage containers 106 in an automated storage and retrieval system 10 can be stored at specific storage locations controlled by storage rules linked to content codes of the storage containers 106. This is done without loading computer resources of the WMS system. In this way, the present invention provides a flexible solution where the main controller 220 of the automated storage and retrieval system 10 determines a specific storage location for a specified storage container 106 based on storage rules that are linked to a content code of the specified storage container 106.

The invention claimed is:

1. A controller system for controlling storage locations of products stored in storage containers in an automated storage and retrieval system operated by container handling vehicles, wherein the storage and retrieval system comprises a grid structure with storage columns adapted for holding stacks of storage containers, wherein the grid structure has a corresponding rail system above the storage columns for guiding movements of the vehicles adapted for transferring storage containers to and from the storage columns, wherein each vehicle comprises a vehicle controller connected to driving means for controlling movements of the vehicle along the rail system relative to movements of other vehicles, wherein controlling of container handling vehicles and storage locations of storage containers is handled by a main controller of the automated storage and retrieval system communicating with a Warehouse Management System configured to register each storage container to be stored and type of one or more products placed in the storage container, wherein:

the Warehouse Management System is configured to transfer a set of storage rules to the main controller and to transmit unique identification codes of the storage containers and where a content code module is configured to transmit corresponding content codes of the storage containers to the main controller, wherein each content code is linked to a storage rule that the main controller will apply for storing the storage containers at locations defined by the storage rules;

the main controller is configured to read the content codes and determine a storage location for each storage container according to storage rules linked to the content codes;

the main controller is further configured to select container handling vehicles for transferring the storage containers to storage locations, and to transmit instructions to the vehicle controller of the selected vehicles to transfer the storage containers to the storage locations defined by the storage rules and update a storage location database with the identification and storage locations of the storage containers.

2. The controller system according to claim 1, wherein the one or more storage columns are linked to one or more storage rules, by defining a type of product and a number of a same type of product that can be stored in each storage column.

3. The controller system according to claim 1, wherein the storage rules are defined for products in a storage container by one or more of the following parameters: minimum or maximum distance between products; maximum number of same types of products in a storage column; maximum storage depth in a storage column; maximum or minimum time products should be stored; specific storage columns to be used.

4. The controller system according to claim 3, wherein the main controller is configured to define a first and at least a second set of rules having different parameters.

5. The controller system according to claim 1, wherein the main controller is configured to apply different sets of rules according to a time of day.

6. The system according to claim 1, wherein the main controller is configured to enable or disable the rules according to a time of day.

* * * * *